(12) United States Patent
Shimazu et al.

(10) Patent No.: US 11,030,468 B2
(45) Date of Patent: Jun. 8, 2021

(54) IMAGE PROCESSING APPARATUS

(71) Applicant: KYOCERA Corporation, Kyoto (JP)

(72) Inventors: Tomohiro Shimazu, Yokohama (JP);
Taro Fukasawa, Kawasaki (JP); Takeo Oshima, Ichikawa (JP)

(73) Assignee: KYOCERA Corporation, Kyoto (JP)

( * ) Notice: Subject to any disclaimer, the term of this patent is extended or adjusted under 35 U.S.C. 154(b) by 62 days.

(21) Appl. No.: 16/462,488

(22) PCT Filed: Nov. 21, 2017

(86) PCT No.: PCT/JP2017/041900
§ 371 (c)(1),
(2) Date: May 20, 2019

(87) PCT Pub. No.: WO2018/092919
PCT Pub. Date: May 24, 2018

(65) Prior Publication Data
US 2019/0370570 A1    Dec. 5, 2019

(30) Foreign Application Priority Data

Nov. 21, 2016  (JP) .............................. JP2016-226332
Nov. 21, 2016  (JP) .............................. JP2016-226333
(Continued)

(51) Int. Cl.
*G06K 9/00*     (2006.01)
*G06T 7/187*    (2017.01)
(Continued)

(52) U.S. Cl.
CPC .......... *G06K 9/00805* (2013.01); *G06T 7/187* (2017.01); *G06T 7/246* (2017.01);
(Continued)

(58) Field of Classification Search
CPC ....... G06K 9/00805; G06T 7/73; G06T 7/187; G06T 7/246; G06T 2207/10016; G06T 2207/30204; B60K 2370/152
(Continued)

(56) References Cited

U.S. PATENT DOCUMENTS 6,327,536 B1    12/2001  Tsuji et al.
6,891,563 B2 *  5/2005   Schofield .................. B60R 1/00
                                                          348/143
(Continued)

FOREIGN PATENT DOCUMENTS

JP    2003-212072 A    7/2003
JP    2005-236540 A    9/2005
(Continued)

*Primary Examiner* — Congvan Tran
(74) *Attorney, Agent, or Firm* — Studebaker & Brackett PC

(57) ABSTRACT

An image processing apparatus includes a communication interface and a controller. The communication interface is configured to acquire a first video image capturing an outside area of a moving body. The controller is configured to cause a second video image corresponding to a display region of the first video image to be displayed on a display apparatus. The controller is also configured to detect at least a portion of a detection object in the display region of the first video image, determine whether one or more conditions are met based on a relative positional relationship between the moving body and the detection object and, when it is determined that the one or more conditions are met, cause a first marker corresponding to the detection object to be superimposed on the second video image and displayed on the display apparatus.

28 Claims, 10 Drawing Sheets

(30) Foreign Application Priority Data

Nov. 21, 2016 (JP) .............................. JP2016-226334
Nov. 21, 2016 (JP) .............................. JP2016-226336

(51) Int. Cl.
*G06T 7/246* (2017.01)
*G06T 7/73* (2017.01)

(52) U.S. Cl.
CPC .......... *G06T 7/73* (2017.01); *B60K 2370/152* (2019.05); *G06T 2207/10016* (2013.01); *G06T 2207/30204* (2013.01)

(58) Field of Classification Search
USPC ......................................................... 382/190
See application file for complete search history.

(56) References Cited

U.S. PATENT DOCUMENTS

| | | | |
|---|---|---|---|
| 9,321,399 B2 | 4/2016 | Aimura et al. | |
| 9,513,702 B2* | 12/2016 | Cho | ........................ B60K 35/00 |
| 10,046,700 B2 | 8/2018 | Fujita et al. | |
| 2007/0206835 A1* | 9/2007 | Abe | ........................ H04N 7/181 |
| | | | 382/104 |
| 2011/0181728 A1* | 7/2011 | Tieman | ..................... B60R 1/00 |
| | | | 348/148 |
| 2012/0314074 A1 | 12/2012 | Aimura et al. | |
| 2014/0074356 A1* | 3/2014 | Bone | ....................... G08G 1/167 |
| | | | 701/41 |
| 2015/0130942 A1 | 5/2015 | Fujita et al. | |
| 2016/0063705 A1* | 3/2016 | Xu | ....................... H04N 5/23238 |
| | | | 382/199 |
| 2016/0159281 A1* | 6/2016 | Jang | .......................... B60R 1/00 |
| | | | 348/148 |
| 2017/0220879 A1 | 8/2017 | Nakamura et al. | |
| 2019/0291642 A1* | 9/2019 | Chae | .................. G06K 9/00791 |

FOREIGN PATENT DOCUMENTS

| | | |
|---|---|---|
| JP | 2006-074105 A | 3/2006 |
| JP | 2009-040113 A | 2/2009 |
| JP | 2009-265802 A | 11/2009 |
| JP | 2010-234851 A | 10/2010 |
| JP | 2010-254115 A | 11/2010 |
| JP | 2012-227699 A | 11/2012 |
| JP | 2013-132976 A | 7/2013 |
| JP | 2014-006776 A | 1/2014 |
| JP | 2014-229997 A | 12/2014 |
| JP | 2015-008453 A | 1/2015 |
| JP | 2015-136056 A | 7/2015 |
| JP | 2016-043778 A | 4/2016 |
| WO | 2011/108218 A1 | 9/2011 |
| WO | 2013/175753 A1 | 11/2013 |
| WO | 2016/017272 A1 | 2/2016 |

\* cited by examiner

IMAGE PROCESSING APPARATUS

CROSS-REFERENCE TO RELATED APPLICATION

This application claims priority to and the benefit of Japanese Patent Applications No. 2016-226332, No. 2016-226333, No. 2016-226334, and No. 2016-226336 filed on Nov. 21, 2016, the entire contents of which are incorporated herein by reference.

TECHNICAL FIELD

The present disclosure relates to an image processing apparatus.

BACKGROUND

Conventionally, technologies for displaying a video image of an outside area of a moving body such as a vehicle are known. For example, a technology for controlling power supply to a monitor that displays a video image captured by a camera provided to a vehicle is known.

SUMMARY

An image processing apparatus according to an embodiment of the present disclosure includes a communication interface and a controller. The communication interface is configured to acquire a first video image capturing an outside area of a moving body. The controller is configured to cause a second video image corresponding to a display region of the first video image to be displayed on a display apparatus. The controller is also configured to detect at least a portion of a detection object in the display region of the first video image, determine whether one or more conditions are met based on a relative positional relationship between the moving body and the detection object and, when it is determined that the one or more conditions are met, cause a first marker corresponding to the detection object to be superimposed on the second video image and displayed on the display apparatus.

An imaging apparatus according to an embodiment of the present disclosure includes an image sensor and a controller. The image sensor is configured to generate a first video image capturing an outside area of a moving body. The controller is configured to cause a second video image corresponding to a display region of the first video image to be displayed on a display apparatus. The controller is also configured to detect at least a portion of a detection object in the display region of the first video image, determine whether one or more conditions are met based on a relative positional relationship between the moving body and the detection object and, when it is determined that the one or more conditions are met, cause a first marker corresponding to the detection object to be superimposed on the second video image and displayed on the display apparatus.

A display system according to an embodiment of the present disclosure includes a display apparatus, an imaging apparatus, and an image processing apparatus. The imaging apparatus is configured to generate a first video image capturing an outside area of a moving body. The image processing apparatus is configured to cause a second video image corresponding to a display area of the first video image to be displayed on the display apparatus. The image processing apparatus is also configured to detect at least a portion of a detection object in the display region of the first video image, determine whether one or more conditions are met based on a relative positional relationship between the moving body and the detection object and, when it is determined that the one or more conditions are met, cause a first marker corresponding to the detection object to be superimposed on the second video image and displayed on the display apparatus.

An image processing apparatus according to an embodiment of the present disclosure includes a communication interface and a controller. The communication interface is configured to acquire a first video image capturing an outside area of a moving body. The controller is configured to cause a second video image corresponding to a display region of the first video image to be displayed on a display apparatus. The controller is also configured to detect at least a portion of a detection object in the display region of the first video image and perform specific image processing on a region corresponding to the at least a portion of the detection object in the second video image.

An imaging apparatus according to an embodiment of the present disclosure includes an image sensor and a controller. The image sensor is configured to generate a first video image capturing an outside area of a moving body. The controller is configured to cause a second video image corresponding to a display region of the first video image to be displayed on a display apparatus. The controller is also configured to detect at least a portion of a detection object in the display region of the first video image and perform specific image processing on a region corresponding to the at least a portion of the detection object in the second video image.

A display system according to an embodiment of the present disclosure includes a display apparatus, an imaging apparatus, and an image processing apparatus. The imaging apparatus is configured to generate a first video image by capturing an outside area of a moving body. The image processing apparatus is configured to cause a second video image corresponding to a display region of the first video image to be displayed on the display apparatus. The image processing apparatus is also configured to detect at least a portion of a detection object in the display region of the first video image and perform specific image processing on a region corresponding to the at least a portion of the detection object in the second video image.

An image processing apparatus according to an embodiment of the present disclosure includes a communication interface and a controller. The communication interface is configured to acquire a first video image capturing an outside area of a moving body. The controller is configured to cause a second video image corresponding to a display region of the first video image to be displayed on a display apparatus. The controller is also configured to detect at least a portion of a detection object in a detection region of the first video image and, when a detection position of the at least a portion of the detection object in the first video image is located outside of the display region and inside of the detection region, cause a marker corresponding to the detection object to be superimposed on the second video image and displayed on the display apparatus.

An imaging apparatus according to an embodiment of the present disclosure includes an image sensor and a controller. The image sensor is configured to generate a first video image capturing an outside area of a moving body. The controller is configured to cause a second video image corresponding to a display region of the first video image to be displayed on a display apparatus. The controller is also configured to detect at least a portion of a detection object in a detection region of the first video image and, when a detection position of the at least a portion of the detection object in the first video image is located outside of the display region and inside of the detection region, cause a marker corresponding to the detection object to be superimposed on the second video image and displayed on the display apparatus.

A display system according to an embodiment of the present disclosure includes a display apparatus, an imaging apparatus, and an image processing apparatus. The imaging apparatus is configured to generate a first video image capturing an outside area of a moving body. The image processing apparatus is configured to cause a second video image corresponding to a display region of the first video image to be displayed on the display apparatus. The image processing apparatus is also configured to detect at least a portion of a detection object in a detection region of the first video image and, when a detection position of the at least a portion of the detection object in the first video image is located outside of the display region and inside of the detection region, cause a marker corresponding to the detection object to be superimposed on the second video image and displayed on the display apparatus.

An image processing apparatus according to an embodiment of the present disclosure includes a communication interface and a controller. The communication interface is configured to acquire a first video image capturing an outside area of a moving body. The controller is configured to display a second video image corresponding to a display region of the first video image in a display apparatus. The controller is also configured to detect at least a portion of a detection object in a detection region of the first video image and, when a detection position of the at least a portion of the detection object in the first video image is located outside of the display region and inside of the detection region, change the display region to encompass the detection position.

An imaging apparatus according to an embodiment of the present disclosure includes an image sensor and a controller. The image sensor is configured to generate a first video image capturing an outside area of a moving body. The controller is configured to cause a second video image corresponding to a display region of the first video image to be displayed on a display apparatus. The controller is also configured to detect at least a portion of a detection object in a detection region of the first video image and, when a detection position of the at least a portion of the detection object in the first video image is located outside of the display region and inside of the detection region, change the display region to encompass the detection position.

A display system according to an embodiment of the present disclosure includes a display apparatus, an imaging apparatus, and an image processing apparatus. The imaging apparatus is configured to generate a first video image capturing an outside area of a moving body. The image processing apparatus is configured to cause a second video image corresponding to a display region of the first video image to be displayed on the display apparatus. The image processing apparatus is also configured to detect at least a portion of a detection object in a detection region of the first video image and, when a detection position of the at least a portion of the detection object in the first video image is located outside of the display region and inside of the detection region, change the display region to encompass the detection position.

DETAILED DESCRIPTION

There is room for improvement of conventional technologies for displaying a video image of an outside area of a moving body. The present disclosure relates to an image processing apparatus, an imaging apparatus, and a display system that improve the convenience of technology for displaying a video image of an outside area of a moving body. The image processing apparatus, the imaging apparatus, and the display system according to an embodiment of the present disclosure improve the convenience of technology for displaying a video image of an outside area of a moving body. Hereinafter, an embodiment the present disclosure will be described with reference to the accompanying drawings.

(Display System)

A display system 10 according to an embodiment of the present disclosure will be described with reference to FIG. 1.

Figure 1:
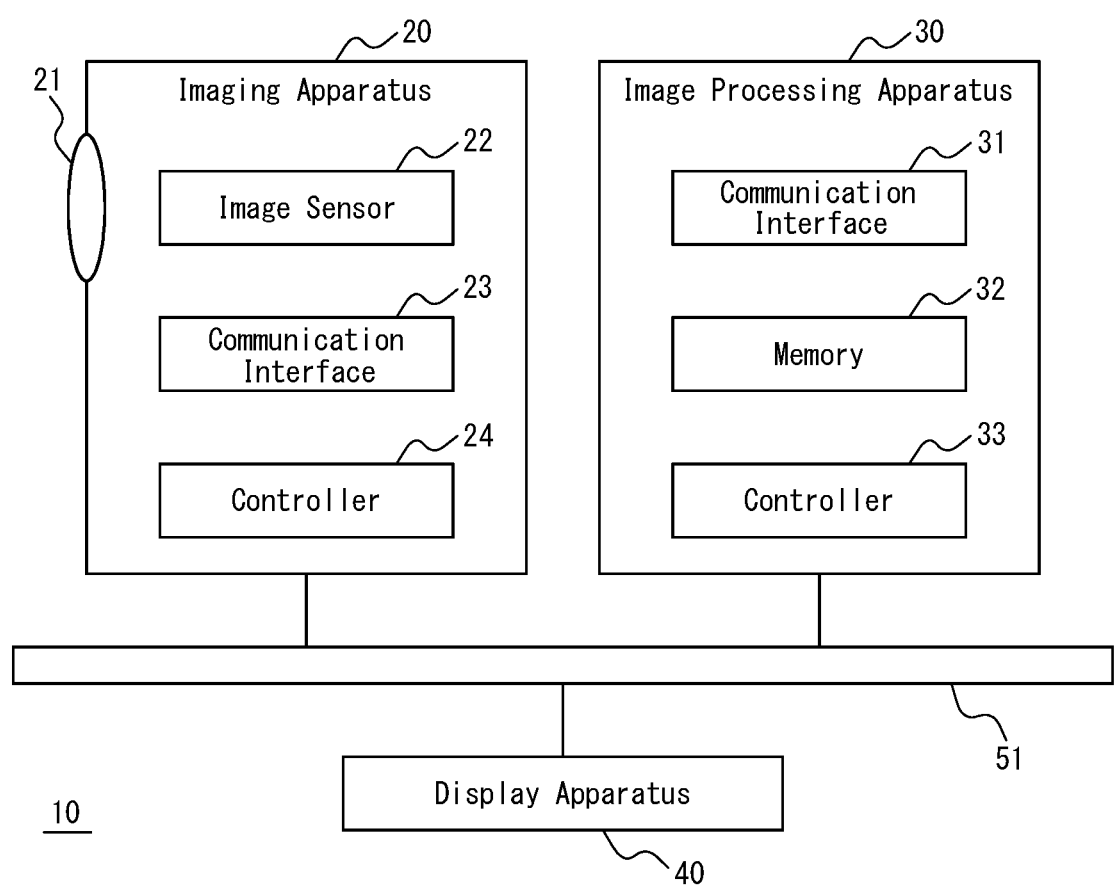
FIG. 1 is a block diagram schematically illustrating a configuration of a display system according to an embodiment of the present disclosure.

As illustrated in FIG. 1, the display system 10 includes an imaging apparatus 20, an image processing apparatus 30, and a display apparatus 40. Each constituent element of the display system 10 can transmit and receive information via, for example, a network 51. The network 51 may include, for example, a radio communication, a wired communication, or a Controller Area Network (CAN).

In some embodiments, some or all of the constituent elements of the display system 10 may be integrally formed as one apparatus. For example, the image processing apparatus 30 may be incorporated in the imaging apparatus 20 or the display apparatus 40.

Figure 2:
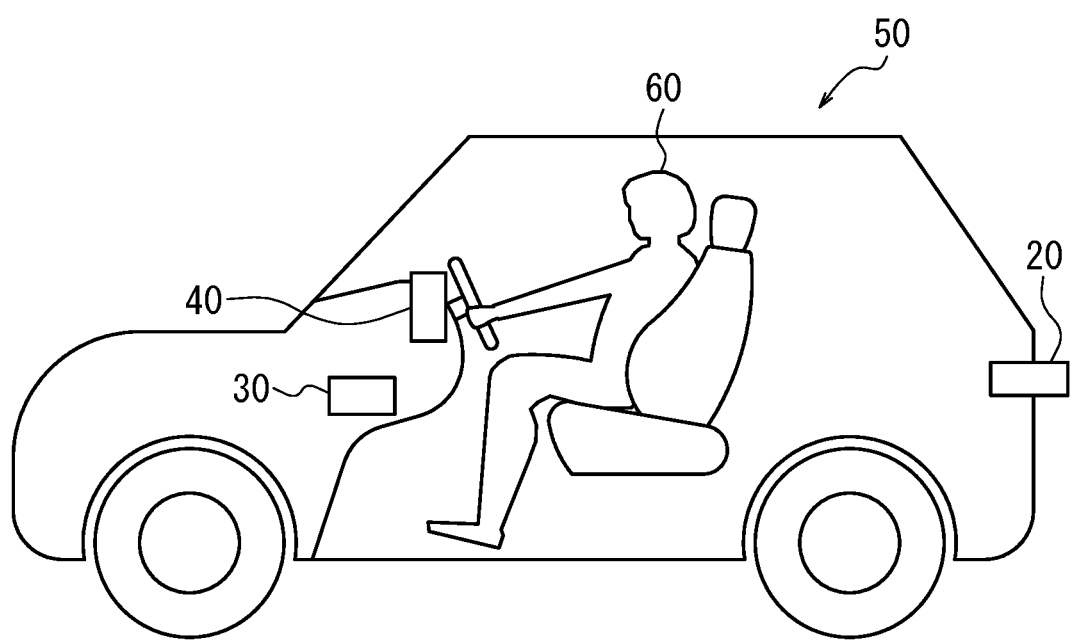
FIG. 2 is a diagram illustrating a vehicle having the display system mounted thereon viewed from a left side.

As illustrated in FIG. 2, the imaging apparatus 20, the image processing apparatus 30, and the display apparatus 40 may be provided to a moving body 50. The term "moving body" as used herein encompasses, for example, vehicles, watercraft, and aircraft. Vehicles include, for example, automobiles, industrial vehicles, rail vehicles, domestic vehicles, and fixed-wing aircrafts that travel on a runway. Automobiles may include, for example, cars, trucks, buses, motorcycles, and trolley buses. Industrial vehicles include, for example, agricultural vehicles and construction vehicles. Industrial vehicles for industrial purposes include, for example, forklifts and golf carts. Industrial vehicles for agricultural purpose include, for example, tractors, tillers, transplanters, binders, combine harvesters, and lawn mowers. Industrial vehicles for construction purposes include, for example, bulldozers, scrapers, excavators, crane trucks, dump trucks, and load rollers. Vehicles may include those that travel on human power. Vehicle classifications are not limited to the above examples. For example, vehicles may include industrial vehicles authorized to travel on the road. The same type of vehicle may be included in a plurality of categories. Watercraft may include, for example, jetboats, motorboats, and tankers. Aircraft may include, for example, fixed-wing aircraft and rotorcraft.

An imaging apparatus 20 can capture an outside area of the moving body 50. The imaging apparatus 20 may be disposed at any position inside or outside of the moving body 50. For example, the imaging apparatus 20 is positioned in a rear portion of the moving body 50 as illustrated in FIG. 2 to be able to capture an outside area behind the moving body 50. The image processing apparatus 30 may be disposed at any position in the moving body 50. The display apparatus 40 can be viewed by a subject 60. The display apparatus 40 may be disposed in any position in the moving body 50. For example, the display apparatus 40 is disposed in a dashboard of the moving body 50 as illustrated in FIG. 2.

(Imaging Apparatus)

The imaging apparatus 20 will be described in detail. The imaging apparatus 20 includes an imaging optical system 21, an image sensor 22, a communication interface 23, and a controller 24, as illustrated in FIG. 1 by way of example.

The imaging optical system 21 forms a subject image. For example, the imaging optical system 21 may include an aperture and one or more lenses.

The image sensor 22 includes a plurality of pixels arranged in a two-dimensional manner. The image sensor 22 may include, for example, a Charge Coupled Device (CCD) image sensor or a Complementary Metal Oxide Semiconductor (CMOS) image sensor. The image sensor 22 can capture a subject image formed by the imaging optical system 21 and generate a captured image.

The communication interface 23 may include a communication interface capable of communicating with an external apparatus. The communication interface 23 may be capable of transmitting and receiving information via the network 51. The external apparatus may include, for example, the image processing apparatus 30. The "communication interface" used herein may include, for example, a physical connector or a wireless communication device. The physical connector may include an electrical connector which supports transmission of electrical signals, an optical connector which supports transmission of optical signals, or an electromagnetic connector which supports transmission of electromagnetic waves. The electrical connector may be a connector conforming to IEC60603, a connector conforming to the USB standard, a connector compatible with an RCA connector, a connector compatible with an S-terminal defined by EIAJ CP-1211A, a connector compatible with a D-terminal defined in EIAJ RC-5237, a connector conforming to the HDMI (HDMI is a registered trademark in Japan, other countries, or both) standard, or a connector compatible with a coaxial cable including British Naval connector, Baby-series N connector, or the like (BNC). The optical connector may include a variety of connectors conforming to IEC 61754. The wireless communication device may include those conforming to Bluetooth (Bluetooth is a registered trademark in Japan, other countries, or both) or standards including IEEE802.11. The wireless communication device includes at least one antenna.

The controller 24 includes at least one processor. The "processor" used herein may include a specialized processor dedicated to specific processing or a general-purpose processor configured to perform a specific function by reading a specific program. The specialized processor may include a Digital Signal Processor (DSP) or an Application Specific Integrated Circuit (ASIC). The processor may include a Programmable Logic Device (PLD). The PLD may include a Field-Programmable Gate Array (FPGA). The controller 24 may be one of a System-on-a-Chip (SoC) and a System In a Package (SiP) in which one or more processors cooperate with one another.

The controller 24 is configured to control overall operation of the imaging apparatus 20. The controller 24 may cause the image sensor 22 to generate captured images at any frame rate. The frame rate may approximately correspond to, for example, a frame rate at which images can be displayed on the display apparatus 40. The controller 24 may perform predetermined image processing on the captured image. The image processing may include, for example, exposure adjustment, white balancing, distortion correction, and the like. The controller 24 outputs the captured image to the image processing apparatus 30 via the communication interface 23. For example, the controller 24 may sequentially output captured images at the frame rate described above. Hereinafter, each captured image output at the frame rate described above will also be simply referred to as a frame. A plurality of captured images output from the imaging apparatus 20 will also be referred to as first video images. For example, when the frame rate is 60 frames per second (fps), sixty images captured each second are output as the first video images.

(Image Processing Apparatus)

The image processing apparatus 30 will be described in detail. The image processing apparatus 30 includes a communication interface 31, a memory 32, and a controller 33.

The communication interface 31 may include a communication interface capable of communicating with various external apparatuses. The external apparatuses may include, for example, the imaging apparatus 20, the display apparatus 40, an Electronic Control Unit or Engine Control Unit (ECU) provided to the moving body 50, a speed sensor, an acceleration sensor, a rotation angle sensor, a steering angle sensor, an engine speed sensor, an accelerator sensor, a brake sensor, an illumination sensor, a raindrop sensor, a travel distance sensor, an obstacle detection device using a millimeter wave radar, an ultrasonic sonar or the like, an Electronic Toll Collection system (ETC) receiving apparatus, a Global Positioning System (GPS) apparatus, a navigation apparatus, an Internet server, a cellular phone, and the like.

The communication interface 31 may include a communication interface for pedestrian-vehicle communication, road-vehicle communication, and inter-vehicle communication. The communication interface 31 may include a receiver which is compatible with a light beacon for Dedicated Short-Range Communication (DSRC) or Vehicle Information and Communication System (VICS) (VICS is a registered trademark in Japan, other countries, or both) provided in Japan. The communication interface 31 may include a receiver which is compatible with the road traffic information providing systems of other countries.

The communication interface 31 may be capable of acquiring various information from the external apparatuses. For example, the communication interface 31 may be capable of acquiring moving body information and environmental information.

The moving body information may include any information associated with the moving body 50. For example, the moving body information may include, with respect to the moving body 50, a speed, an acceleration, a turning gravity, an inclination, a direction, a turning status, a steering angle of the steering wheel, the temperature of the cooling water, a fuel remaining amount, a battery remaining amount, a battery voltage, an engine speed, a gear position, presence or absence of a reverse signal, the presence or absence of accelerator operation, an accelerator position, the presence or absence of brake operation, the brake pedal pressing degree, the presence or absence of parking brake operation, a rotational speed difference between the front and rear wheels or 4 wheels, tire pressure, an expansion and contraction amount of the damper, the spatial position of the eyes of the driver, the number of passengers and seat positions, seat belt fastening information, opening and closing of the doors, opening and closing of the windows, interior temperature, the presence or absence of operation of the air conditioning, air-conditioning setting temperature, an air-conditioning air volume, outside air circulation setting, an operating condition of the wiper, a driving mode, information about connection to an external device, current time, average fuel consumption, current fuel consumption, lighting states of various lamps, positional information, and route information to a destination. The various lamps may include, for example, headlamps, fog lamps, reversing lamps, position lamps, and indicator lamps.

The environmental information may include any information about the environment outside of the moving body 50. The environmental information may include, for example, brightness around the moving body 50, the weather, air pressure, outside air temperature, map information, traffic information, road construction information, temporary change of the speed limit of the road, objects detected by other vehicles, and lighting states of traffic signals.

The memory 32 may include a temporary storage device and a secondary storage device. The memory 32 may include, for example, a semiconductor memory, a magnetic memory, or an optical memory. The semiconductor memory may include a volatile memory or a nonvolatile memory. The magnetic memory may include, for example, a hard disk or a magnetic tape. The optical memory may include, for example, a Compact Disc (CD), a Digital Versatile Disc (DVD), and Blu-ray Disc (BD) (BD and Blu-ray are registered trademarks in Japan, other countries, or both). The memory 32 stores various information and programs necessary for the operation of the image processing apparatus 30.

The controller 33 includes one or more processors. The controller 33 controls overall operations of the image processing apparatus 30.

The controller 33 may acquire the moving body information and the environmental information from an external apparatus via the communication interface 31. The controller 33 may determine a predicted path of the moving body 50 based on, for example, the moving body information. Hereinafter, the predicted path of the moving body 50 will also be referred to as a first predicted path.

The controller 33 may acquire the first video images from the imaging apparatus 20 via the communication interface 31. The first video images include a detection region and a display region.

The controller 33 may detect at least a portion of a detection object in the detection region of the acquired first video images. The detection region of the first video images may be at least a portion of a captured image for each frame of the first video images. Each frame of the first video images may be referred to as a captured image. The detection region of the first video images may be larger than the display region. The detection region of the first video images may encompass the display region. The controller 33 can detect the detection object located inside of the display region. The controller 33 can detect the detection object located outside of the display region and inside of the detection region. A region inside of the detection region and the display region may be referred to as a first region. A region inside of the detection region and outside of the display region may be referred to as a second region.

The detection object may include a plurality of types of objects. The types of objects may include, for example, a person, another moving body, a road, a lane, a white line, a gutter, a sidewalk, a pedestrian crossing, a road sign, a traffic sign, a guardrail, a wall, and a traffic signal. The types of objects detectable by the controller 33 are not limited these examples. In a case where a portion of the detection object is concealed behind another body in the first video images, the detection object may include at least a portion that is not concealed behind the body. For example, when the lower body of a pedestrian is concealed behind an obstacle in the first video images, the controller 33 may detect the upper body of the pedestrian. Any appropriate object detection algorithms may be employed for the detection of at least a portion of the detection object. For example, the controller 33 may detect at least a portion of the detection object by employing algorithm such as pattern matching feature point extraction using the captured image for each frame of the first video images.

When the controller 33 detects at least a portion of the detection object in the first video images, the controller 33 may determine a predicted path of the detection object based on the first video images. Hereinafter, the predicted path of the detection object will also be referred to as a second predicted path. Any appropriate algorithm may be employed for the determination of the second predicted path. For example, the controller 33 may determine the second predicted path based on changes in the orientation and position of the detection object in the captured image for each frame of the first video images.

When the controller 33 detects at least a portion of the detection object in the first video images, the controller 33 may estimate a relative positional relationship between the moving body 50 and the detection object based on the first video images. The relative positional relationship may include, for example, a distance between the moving body 50 and the detection object, or whether the first predicted path of the moving body 50 and the second predicted path of the detection object overlap with each other. Any appropriate algorithm may be employed for the estimation of the distance between the moving body 50 and the detection object. For example, the controller 33 may estimate the distance between the moving body 50 and the detection object by employing a motion stereo method using the captured image for each frame of the first video images signal. In some embodiments, the controller 33 may acquire information indicating the relative positional relationship between the moving body 50 and the detection object from an external apparatus via the communication interface 31.

When the distance between the moving body 50 and the detection object decreases, the controller 33 may determine which one of the moving body 50 and the detection object contributes more to the decrease in distance. Any appropriate algorithm may be employed to determine the respective contributions of the moving body 50 and the detection object with respect to the decrease in distance. In one example, the controller 33 may detect a moving speed of the moving body 50 based on the moving body information. The controller 33 may detect a moving speed of the detection object based on, for example, a positional change of the detection object in the captured image for each frame of the first video images. The controller 33 may determine that one of the moving body 50 and the detection object that has a greater moving speed contributes more to the decrease in distance. In another example, when the moving speed of the moving body 50 is smaller than a reference value, the controller 33 may determine that the detection object contributes more to the decrease in distance. When the moving speed of the moving body 50 is equal to or larger than the reference value, the controller 33 may determine that the moving body 50 contributes more to the decrease in distance. The reference value may be set appropriately, and may for example be set to approximately zero. Operation of the image processing apparatus 30 based on the respective contributions of the moving body 50 and the detection object with respect to the decrease in distance will be described in detail later.

When at least a portion of the detection object is detected in the first video images, the controller 33 may determine based on the first video images whether there is a possibility of contact between the moving body 50 and the detection object. Any appropriate algorithm may be employed to determine the possibility of contact between the moving body 50 and the detection object. For example, when at least one of a condition specifying that the distance between the moving body 50 and the detection object is smaller than a predetermined threshold and a condition specifying that a rate at which the distance is decreasing is equal to or greater than a predetermined threshold is met, the controller 33 may determine that there is a possibility of contact between the moving body 50 and the detection object. Operation of the image processing apparatus 30 in accordance with the presence or absence of the possibility will be described in detail later.

The controller 33 may cause second video images corresponding to the display region of the first video images acquired from the imaging apparatus 20 to be displayed on the display apparatus 40. In particular, the controller 33 may output the second video images to the display apparatus 40 via the communication interface 31. For example, when the controller 33 detects a rearward movement of the moving body 50 based on the moving body information, the controller 33 may cause the second video images to be displayed on the display apparatus 40. For example, the controller 33 may detect the rearward movement based on a shift position of the transmission gear. For example, the controller 33 may detect the rearward movement based on a reverse signal output from the moving body at the time of a rearward movement. The second video images may include, for example, a video image extracted from the display region of the captured image for each frame of the first video images. The display region of the first video images may be at least a region of the captured image for each frame of the first video images. The display region may be smaller than the detection region. The display region may be encompassed within the detection region. A position, a shape, and a size of the display region may be determined appropriately. The controller 33 may change the position, the shape, and the size of the display region. The position, the shape, and the size of the display region may be changed to substantially match the detection region.

The controller 33 may cause various markers in combination with the second video images to be displayed on the display apparatus 40. A method for such combining includes overwriting or mixing. The marker may include, for example, one or more images. The controller 33 may dynamically change a display mode of at least a portion of the marker superimposed on the second video images. The display mode may include, for example, a position, a size, a shape, a color, or a shading of at least a portion of a marker in the second video images. When the controller 33 displays a marker corresponding to the detection object detected in the first video images, the controller 33 may determine the display mode of the marker in accordance with the type of the marker. The operation of the image processing apparatus 30 for causing various markers to be displayed on the display apparatus 40 will be described in detail later.

(Display Apparatus)

The display apparatus 40 will be described in detail. The display apparatus 40 may include, for example, a liquid crystal display or an organic Electro-Luminescence (EL) display. The display apparatus 40 may display, for example, the second video images input from the image processing apparatus 30 via the network 51. The display apparatus 40 may function as a touchscreen capable of receiving user operations. The display apparatus 40 may include a switch or a key capable of receiving a user operation. The switch may include a mechanical switch or an electronic switch. The key may include a mechanical key or an electronic key. When the display apparatus 40 receives a user operation, the display apparatus 40 may transmit a user input corresponding to the user operation to the image processing apparatus 30.

The second video images and the various markers displayed on the display apparatus 40 under the control of the image processing apparatus 30 will be described in detail with reference to FIG. 3 to FIG. 16. According to the present disclosure, the terms "up-down direction" and "left-right direction" in a video image or an image correspond to the two-dimensional directions in the video image or the image. According to the present disclosure, the terms "height direction", "horizontal direction", and "depth direction" in a video image or an image correspond to the three-dimensional directions in the space captured in the video image or the image.

First Example

Figure 3:
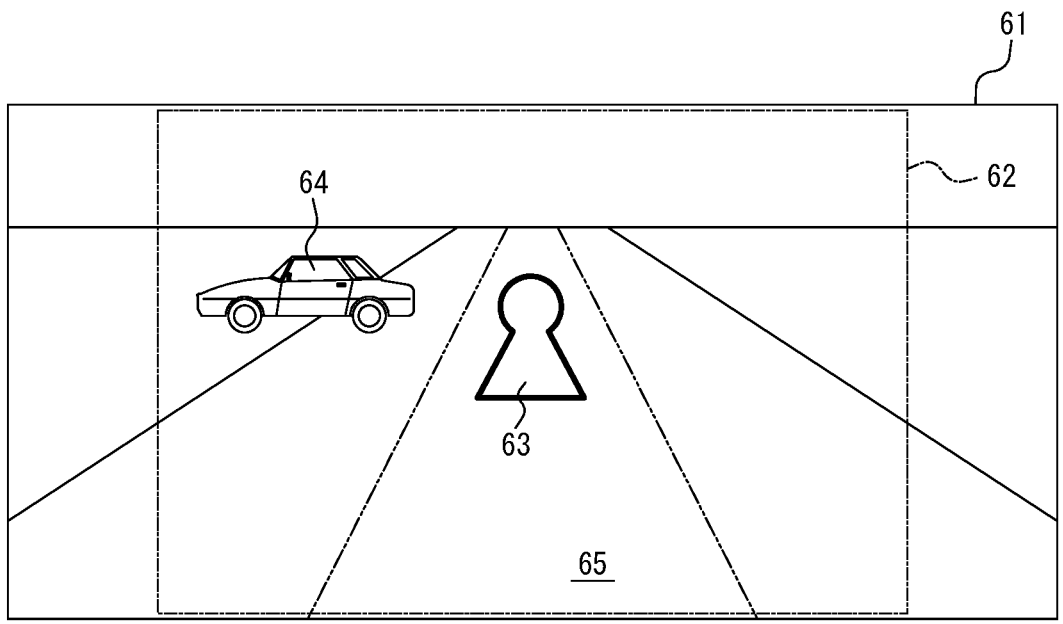
FIG. 3 is a diagram illustrating a first example of a first video image.

FIG. 3 illustrates a first example of a detection region 61 of a first video image acquired by the image processing apparatus 30 from the imaging apparatus 20. In the example illustrated in FIG. 3, the detection region 61 is longer in the left-right direction than the up-down direction. The display region 62 is positioned in the center of the detection region 61 with respect to the left-right direction. The controller 33 may detect each of a pedestrian 63 and a vehicle 64 captured in the display region 62 of the first video image as a detection object.

The controller 33 determines whether one or more conditions are met based on a relative positional relationship between a detection object detected within the display region 62 of the first video image and the moving body 50. The one or more conditions may include, for example, a first condition specifying that the detection object is located on the first predicted path 65 of the moving body 50. The one or more conditions may include, for example, a second condition specifying that at least a portion of the first predicted path 65 of the moving body 50 and at least a portion of the second predicted path of the detection object overlap with each other. When the controller 33 determines that one or more of the conditions are met, the controller 33 may cause a predetermined marker corresponding to the detection object to be superimposed on the second video images and displayed on the display apparatus 40. The predetermined marker may include a first marker, a second marker, or a third marker.

In the first example, the controller 33 may determine that the one or more conditions are met with respect to the pedestrian 63. In this case, the controller 33 may display a marker corresponding to the pedestrian 63. The controller 33 may determine that the one or more conditions are not met with respect to the vehicle 64. In this case, the controller 33 does not display the marker corresponding to the vehicle 64.

Figure 4:
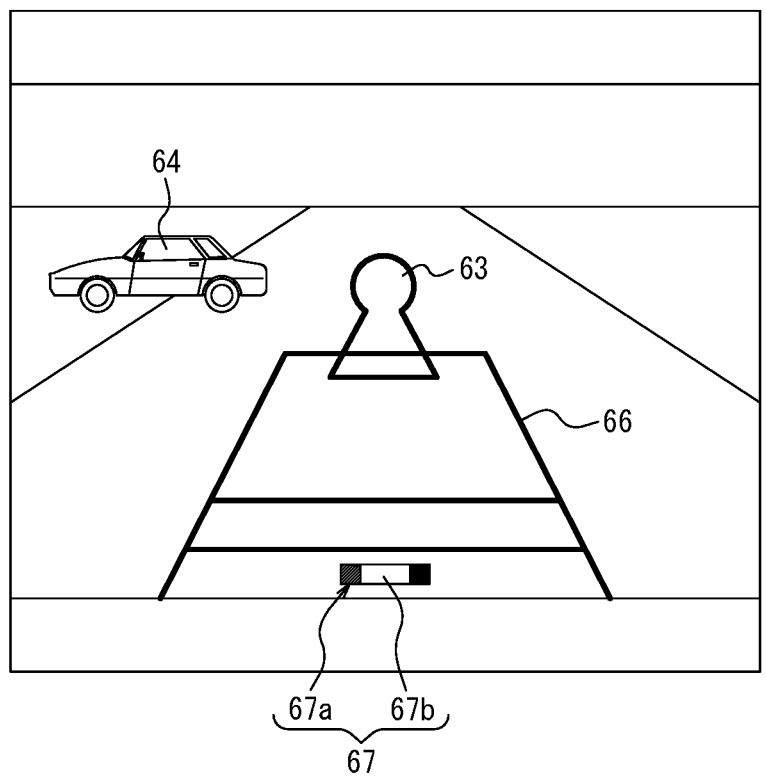
FIG. 4 is a diagram illustrating a first example of a second video image corresponding to a display region of the first video image of FIG. 3.

FIG. 4 illustrates an example of a second video image corresponding to the display region 62 of the first video image illustrated in FIG. 3. When an aspect ratio of the display region 62 of the first video image differs from an aspect ratio of the screen of the display apparatus 40, the controller 33 may output the second video image obtained by cutting out the display region 62 of the first video image and modifying the display region 62 in accordance with the aspect ratio of the screen of the display apparatus 40. The second video image includes the pedestrian 63 and the vehicle 64 as illustrated in FIG. 4.

The controller 33 may cause guide lines 66 which indicate at least a portion of the first predicted path 65 of the moving body 50 illustrated in FIG. 3 by way of example to be superimposed on the second video image and displayed on the display apparatus 40. The controller 33 may dynamically change the guide lines 66 based on, for example, a change of the steering angle of the steering wheel.

An area of the first video image is wider than the display region 62. The controller 33 may change the area of the display region 62. The controller 33 may cause an icon image 67 to be superimposed on the second video image and displayed on the display apparatus 40. For example, an outline 67a of the icon image 67 illustrated in FIG. 4 corresponds to a maximum area of the display region 62 when the area of the display region 62 is changed. A white rectangle 67b of the icon image 67 corresponds to the display region 62. The icon image 67 illustrated in FIG. 4 indicates a position and a size of the display region 62 relative to the maximum area of the display region 62.

Figure 5:
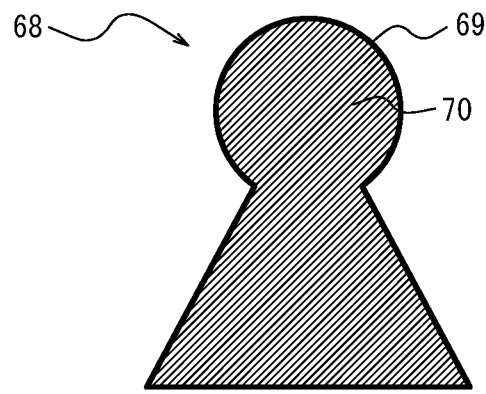
FIG. 5 is a diagram illustrating an example of a third marker to be superimposed on a detection object.

FIG. 5 illustrates an example of a marker to be superimposed on the pedestrian 63 in the second video image. Hereinafter, this marker will also be referred to as a third marker 68. An outline 69 of the third marker 68 may substantially match the outline of the pedestrian 63 detected in the second video image. A region 70 within the outline 69 of the third marker 68 may be filled with a color or pattern corresponding to the type of the detection object, e.g., "person". When the pedestrian 63 is detected in the first video image, the controller 33 may cause the third marker 68 to be superimposed on the pedestrian 63 in the second video image and displayed on the display apparatus 40. This configuration enables the subject 60 to easily view the pedestrian 63 in the second video image. The controller 33 may hide the third marker 68 when a predetermined time has elapsed after the third marker 68 is displayed.

Figure 6:
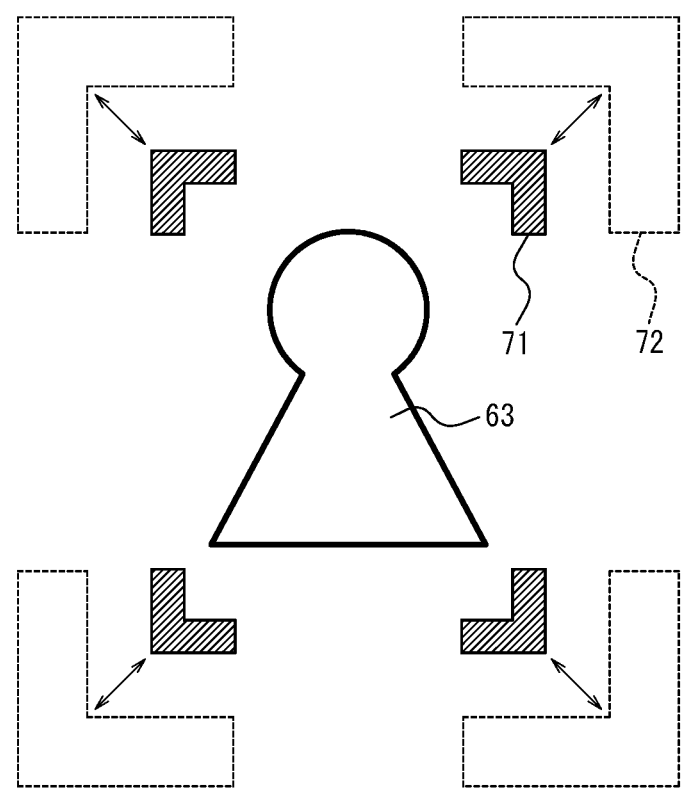
FIG. 6 is a diagram illustrating a first example of a first marker and a second marker displayed in the vicinity of the detection object.

FIG. 6 illustrates examples of two types of markers superimposed in the vicinity of the pedestrian 63 in the second video image. Hereinafter, each of the two types of markers will also be referred to as a first marker 71 and a second marker 72. For example, the controller 33 may cause the first marker 71 and the second marker 72 to be superimposed on the second video image and displayed on the display apparatus 40 after hiding the third marker 68.

The controller 33 may move a position of the first marker 71 following the pedestrian 63 in the second video image. The subject 60 may easily recognize the pedestrian 63 because the first marker 71 follows the pedestrian 63. The first marker 71 is displayed in the vicinity of the pedestrian 63 in a manner spaced apart therefrom. The subject 60 may easily recognize the behavior of the pedestrian 63 when the first marker 71 is displayed on the display apparatus 40. The controller 33 may change a superimposing position of the second marker 72 relative to a superimposing position of the first marker 71 in the second video image. The controller 33 may move the second marker 72 relative to the position of the first marker 71 serving as a reference.

For example, when the distance between the moving body 50 and the pedestrian 63 decreases, the controller 33 may determine that the moving body 50 contributes more to the decrease in distance. In this case, the controller 33 may move the second marker 72 toward the first marker 71. First, the controller 33 displays the second marker 72 in a position distanced from the first marker 71. Subsequently, the controller 33 moves the second marker 72 toward the first marker 71 until the distance therebetween reaches a predetermined distance. Next, the controller 33 hides the second marker 72. Then, the controller 33 displays the second marker 72 in a position distanced from the first marker 71 and repeats the operation described above. In this example, the second marker 72 approaches the first marker 71 displayed as an object. Thus, the subject 60 can recognize that the second marker 72 is approaching the first marker 71.

For example, when the distance between the moving body 50 and the pedestrian 63 decreases, the controller 33 may determine that the pedestrian 63 contributes more to the decrease in the distance. In this case, the controller 33 may move the second marker 72 away from the first marker 71. First, the controller 33 displays the second marker 72 in the vicinity of the first marker 71. Subsequently, the controller 33 moves the second marker 72 away from the first marker 71 until the distance therebetween reaches a predetermined distance. Next, the controller 33 hides the second marker 72. Then, the controller 33 displays the second marker 72 in the vicinity of the first marker 71 and repeats the operation described above. In this example, the second marker 72 is moving away from the first marker 71 displayed as the object. Thus, the subject 60 can recognize that the second marker 72 is moving away from the first marker 71.

The controller 33 changes a moving direction of the second marker 72 relative to the first marker 71 based on the respective contributions of the moving body 50 and the pedestrian 63 with respect to the decrease in distance between the moving body 50 and the pedestrian 63. For example, the subject 60 can recognize whether the moving body 50 is approaching the pedestrian 63 or whether the pedestrian 63 is approaching the moving body 50, based on the moving direction of the second marker 72.

Figure 7:
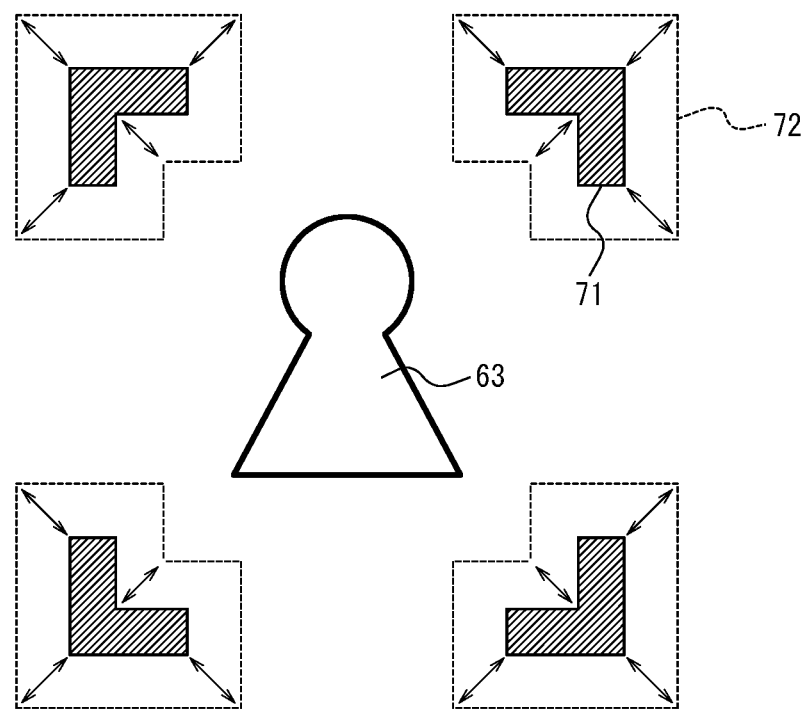
FIG. 7 is a diagram illustrating a second example of the first marker and the second marker displayed in the vicinity of the detection object.
Figure 8:
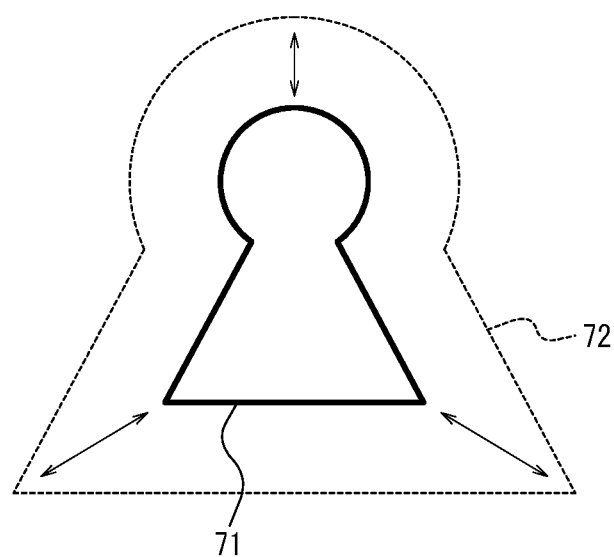
FIG. 8 is a diagram illustrating a third example of the first marker and the second marker displayed in the vicinity of the detection object.

The controller 33 may repeatedly expand and contract the second marker 72 centered on the first marker 71 in the second video image as illustrated in FIG. 7 by way of example. The controller 33 may superimpose the first marker 71 or the second marker 72 having the same shape as the outline 69 of the pedestrian 63 in the second video image as illustrated in FIG. 8 by way of example. The controller 33 may repeatedly expand or contract the second marker 72 centered on the first marker 71. The controller 33 changes between expansion and contraction of the second marker 72 in accordance with the respective contributions of the moving body 50 and the pedestrian 63 with respect to the decrease in distance between the moving body 50 and the pedestrian 63.

When the distance between the detection object and the moving body 50 represented by the first marker 71 and the second marker 72, respectively, becomes smaller than a predetermined threshold, the controller 33 may superimpose another marker on the second video image. Hereinafter, the another marker will also be referred to as a fourth marker. The fourth maker may include any appropriate image. For example, the fourth marker may include an image showing an exclamation mark "!". In this configuration, for example, when the pedestrian 63 and the moving body 50 represented by the first marker 71 and the second marker 72, respectively, become close to each other and have a certain distance or less therebetween, the fourth marker is superimposed on the second video image and displayed. The fourth marker enables recognition that, for example, the pedestrian 63 is positioned in the vicinity of the moving body 50. In some embodiments, the controller 33 may change display modes of the first marker 71 and the second marker 72 when the distance between the detection object and the moving body 50 represented by the first marker 71 and the second marker 72, respectively, falls below the predetermined threshold. For example, the controller 33 may change the colors of the first marker 71 and the second marker 72. This configuration for changing the colors of the markers enables the subject 60 to recognize that, for example, the pedestrian 63 is positioned in the vicinity of the moving body 50.

The controller 33 can detect two detection objects located one behind the other in the depth direction. The controller 33 may display the first marker 71 and the second marker 72 representing the respective two detection objects located one behind the other. The controller 33 may display the first marker 71 and second marker 72 in different appearances together with the two detection objects. For example, the controller 33 may display the first marker 71 and the second marker 72 of a first detection object located on the rear side in an inconspicuous manner as compared to the first marker 71 and the second marker 72 of a second detection object located on the front side. For example, the controller 33 may change characteristics of the first marker 71 and the second marker 72 of the first detection object located on the rear side in the depth direction such that they are dark in color and have a high transmittances and thin lines as compared to the first marker 71 and the second marker 72 of the second detection object located on the front side.

Second Example

Figure 9:
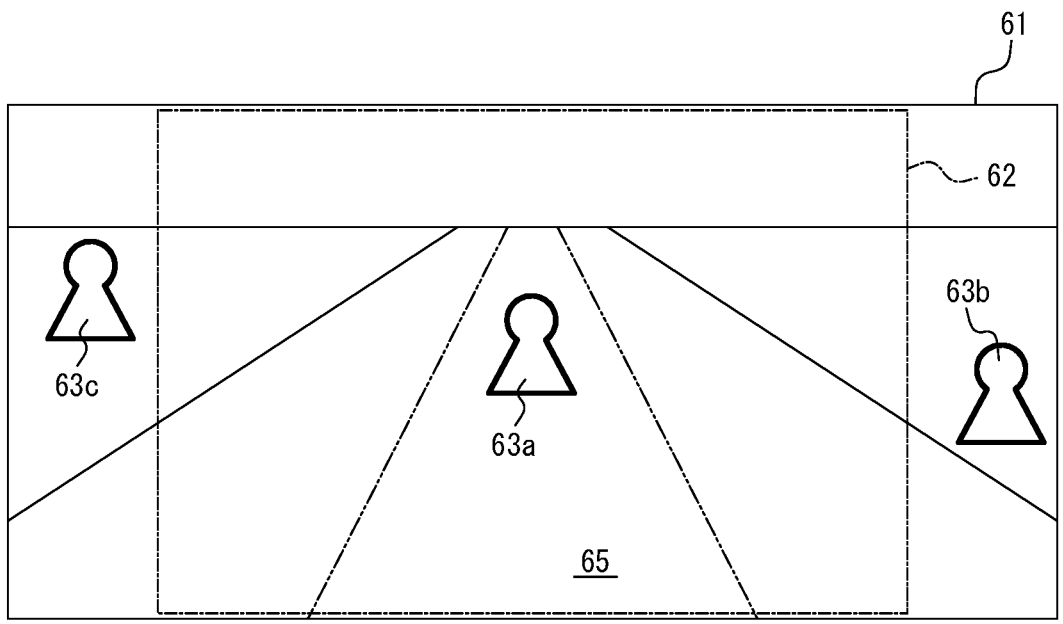
FIG. 9 is a diagram illustrating a second example of the first video image.

FIG. 9 illustrates a second example of the detection region 61 of a first video image acquired by the image processing apparatus 30 from the imaging apparatus 20. In the example illustrated in FIG. 9, the detection region 61 is longer in the left-right direction than the up-down direction. The display region 62 is positioned at the center in the left-right direction of the detection region 61. The controller 33 may detect each of the pedestrian 63*a* located inside of the display region 62 of the first video image and the pedestrians 63*b* and 63*c* located inside of the detection region 61 and outside of the display region 62 as a detection object. The controller 33 performs the same processing on the pedestrian 63*a* as the processing performed on the pedestrian 63 as illustrated in FIG. 3 by way of example.

When a detection position of the detection object in the first video image is outside of the display region 62 and, simultaneously, inside of the detection region 61, the controller 33 may cause a marker corresponding to the detection object to be superimposed on the second video images and displayed in the display apparatus 40. Hereinafter, this marker will also be referred to as a fifth marker. When the controller 33 determines that there is a possibility of contact between the moving body 50 and the detection object, the controller 33 may display the fifth marker. When the detection position of the detection object in the first video image is located on the right side of the display region 62, the controller 33 may cause the fifth marker to be superimposed on the right-side edge region of the second video images and displayed on the display apparatus 40. When the detection position of the detection object in the first video image is located on the left side of the display region 62, the controller 33 may cause the fifth marker to be superimposed on the left-side edge region of the second video image and displayed on the display apparatus 40.

In the second example, a detection position of the pedestrian 63*b* is located on the right side of the display region 62. The controller 33 may determine the possibility of contact between the moving body 50 and the pedestrian 63*b* based on, for example, a distance between the moving body 50 and the pedestrian 63*b* and a rate at which the distance is decreasing. For example, the controller 33 may determine that there is a possibility of contact between the moving body 50 and the pedestrian 63*b*. In this case, the controller 33 may cause the fifth marker to be superimposed on the right-side edge region of the second video images and displayed in the display apparatus 40. The fifth marker corresponding to the pedestrian 63*b* will be described in detail later. The detection position of the pedestrian 63*c* is on the left side of the display region 62. The controller 33 may determine the possibility of contact between the moving body 50 and the pedestrian 63*b* based on, for example, a distance between the moving body 50 and the pedestrian 63*c* and a rate at which the distance is decreasing. For example, the controller 33 may determine that there is no possibility of contact between the moving body 50 and the pedestrian 63*c*. In this case, the controller 33 does not need to display the fifth marker corresponding to the pedestrian 63*c*.

Figure 10:
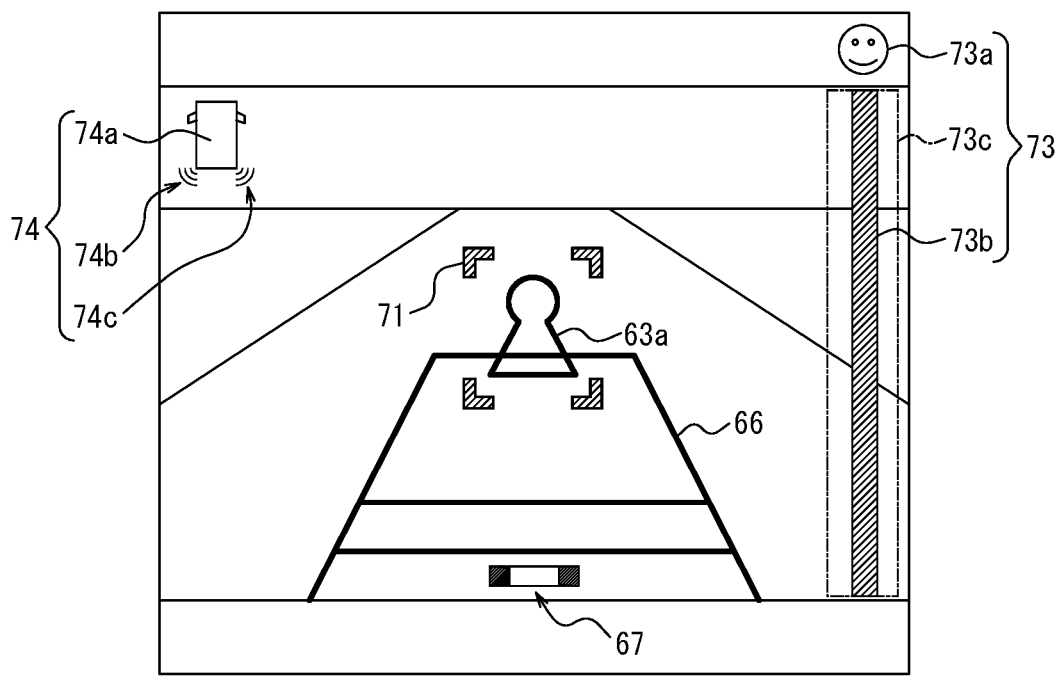
FIG. 10 is a diagram illustrating a second example of a second video image corresponding to a display region of the first video image of FIG. 9.

FIG. 10 illustrates an example of a second video image corresponding to the display region 62 of the first video image illustrated in FIG. 9. As illustrated in FIG. 10, the pedestrian 63a is displayed in the second video image. The pedestrians 63b and 63c are not displayed in the second video image.

The controller 33 may cause, for example, an obstacle image 74 to be superimposed on the second video images and displayed on the display apparatus 40 as illustrated in FIG. 10. The obstacle image 74 indicates a detection result of an obstacle detection apparatus provided to the moving body 50 that uses ultrasonic sonar or the like. The obstacle image 74 may include an image 74a, an image 74b, and an image 74c. The image 74a is an image of the moving body 50 viewed from above. The image 74b is an image indicating that an obstacle is detected on the left rear side of the moving body 50. The image 74c is an image indicating that an obstacle is detected on the right rear side of the moving body 50. The detection result of the obstacle detection apparatus and a detection result of the detection object of the controller 33 may not necessarily coincide. In the example illustrated in FIG. 10, for example, the obstacle image 74 indicates that the obstacle is detected on both the right rear side and the left rear side of the moving body 50. On the other hand, the controller 33 may determine that there is no possibility of contact between the moving body 50 and the pedestrian 63c on the left rear side of the moving body 50. In this case, the controller 33 does not need to display the fifth marker corresponding to the pedestrian 63c.

FIG. 10 illustrates an example of a fifth marker 73 corresponding to the pedestrian 63b. The fifth marker 73 may include an icon image 73a and a band image 73b. The icon image 73a may be an image corresponding to a "person" as the type of the detection object. The icon image 73a enables the subject 60 to recognize that there is a person on the right side of the second video image. The band image 73b is, for example, an image of a band that extends in the up-down direction in the second video image. The band image 73b may be filled with color or a pattern corresponding to the "person" as the type of the detection object. The controller 33 may move the band image 73b within a right-side edge region 73c of the second video image. The controller 33 may change a moving speed and a width of the band image 73b.

The fifth marker 73 will be described in detail. The controller 33 may determine the width of the band image 73b based on the distance between the moving body 50 and the pedestrian 73b. For example, the controller 33b may increase the width of the band image 73b as the distance becomes smaller. The band image 73b enables the subject 60 to recognize the distance between the moving body 50 and the pedestrian 63b based on the width of the band image 73b.

The controller 33 may determine that the moving body 50 contributes more to the reduction of the distance between the moving body 50 and the pedestrian 63b. In this case, the controller 33 repeatedly moves the band image 73b in a first direction within the right-side edge region 73c of the second video image. The first direction may be, for example, a direction directing from the outside to the inside in the left-right direction of the second video image. The controller 33 may determine that the pedestrian 63b contributes more to the reduction of the distance between the moving body 50 and the pedestrian 63b. In this case, the controller 33 repeatedly moves the band image 73b in a second direction within the right-side edge region 73c of the second video image. The second direction may be, for example, a direction directing from the inside to the outside in the left-right direction of the second video image. The band image 73b enables the subject 60 to know whether the moving body 50 is approaching the pedestrian 63b or the pedestrian 63b is approaching the moving body 50, based on a moving direction of the band image 73b.

The controller 33 may determine the moving speed of the band image 73b based on the rate at which the distance between the moving body 50 and the pedestrian 63b is decreasing. For example, the moving speed of the band image 73b may be faster as the rate at which the distance is decreasing is faster. The band image 73b enables the subject 60 to recognize the rate of decrease of the distance between the moving body 50 and the pedestrian 63b based on the moving speed of the band image 73b.

Figure 11:
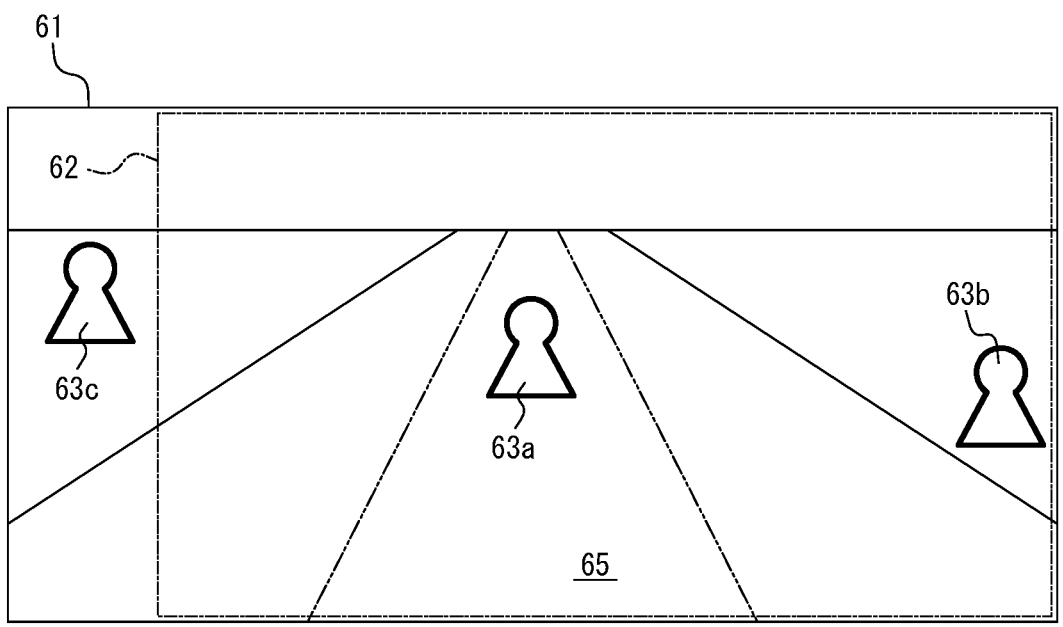
FIG. 11 is a diagram illustrating a third example of the first video image.

In a state in which the fifth marker 73 is displayed, when the controller 33 detects, for example, a user input corresponding to a predetermined user operation, the controller 33 may change the display region 62 to encompass the detection position of the pedestrian 63b in the first video image. For example, the controller 33 may extend the display region 62 of the first video image in the left-right direction and shift the display region 62 to the right in the detection region 61 as illustrated in FIG. 11. This configuration includes the pedestrian 63b in the second video image as illustrated in FIG. 12 by way of example.

The predetermined user operation described above may include any appropriate user operation. For example, the predetermined user operation described above may include a first user operation for changing a steering angle of the steering wheel of the moving body 50. The fifth marker 73 may function as a Graphic User Interface (GUI) configured to receive a second user operation. Hereinafter, the GUI will also be referred to as an interface image. In this case, the predetermined user operation described above may include the second user operation.

The controller 33 may autonomously change the display region 62 such that the detection position of the pedestrian 63b in the first video image is included in the display region 62. In this case, the controller 33 may maintain the autonomous change of the display region 62 until the pedestrian 63b stops being detected in the detection region 61 of the first video image.

Figure 12:
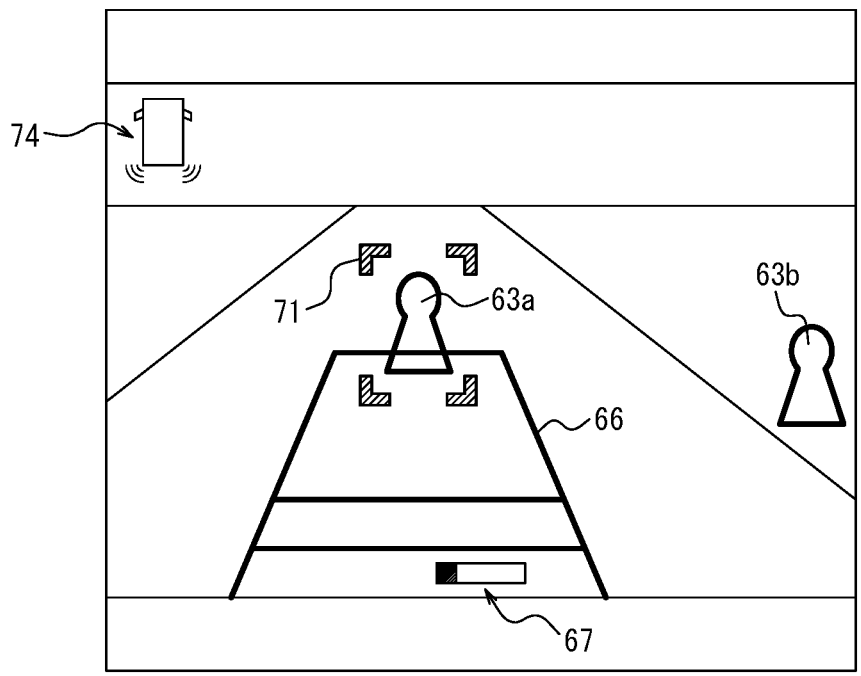
FIG. 12 is diagram illustrating a third example of a second video image corresponding to a display region of the first video image of FIG. 11.

The controller 33 may change the icon image 67 based on the change of the display region 62 as illustrated in FIG. 12 by way of example.

Figure 13:
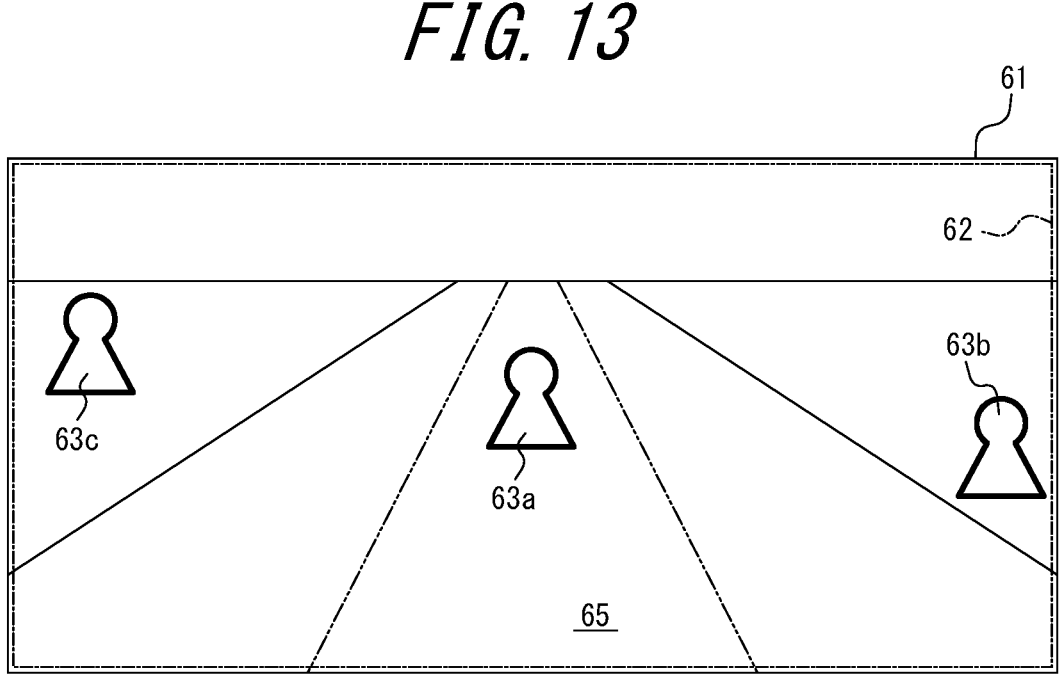
FIG. 13 is a diagram illustrating a fourth example of the first video image.
Figure 14:
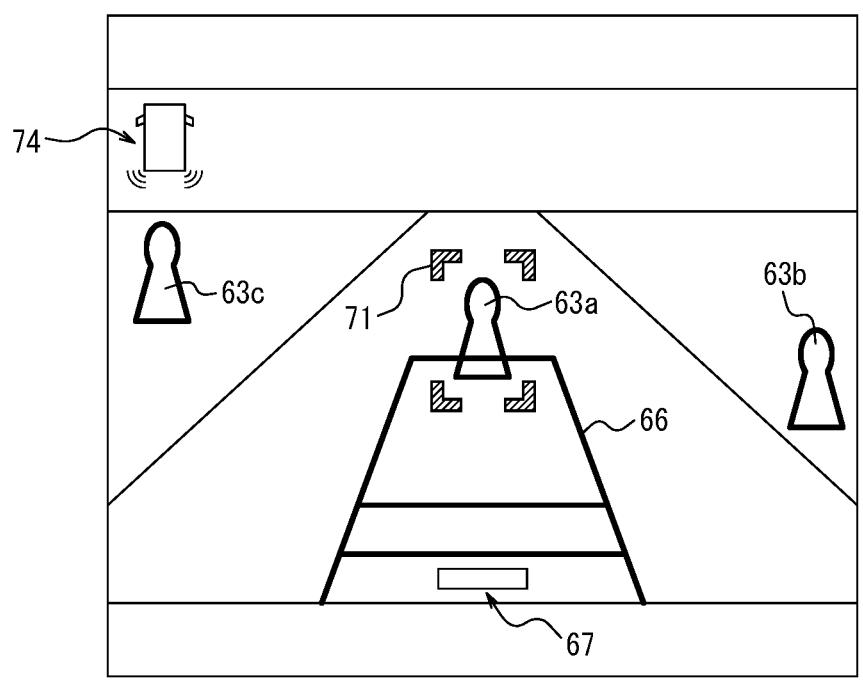
FIG. 14 is diagram illustrating a fourth example of a second video image corresponding to a display region of the first video image of FIG. 13.

The controller 33 may change the display region 62 of the first video image based on, for example, a pinch-in operation and a pinch-out operation of the display apparatus 40. For example, the controller 33 may substantially match the display region 62 with the detection region 61 as illustrated in FIG. 13. In this case, all detection objects in the detection region 61 are displayed on the display apparatus 40 as illustrated in FIG. 14 by way of example.

Third Example

Figure 15:
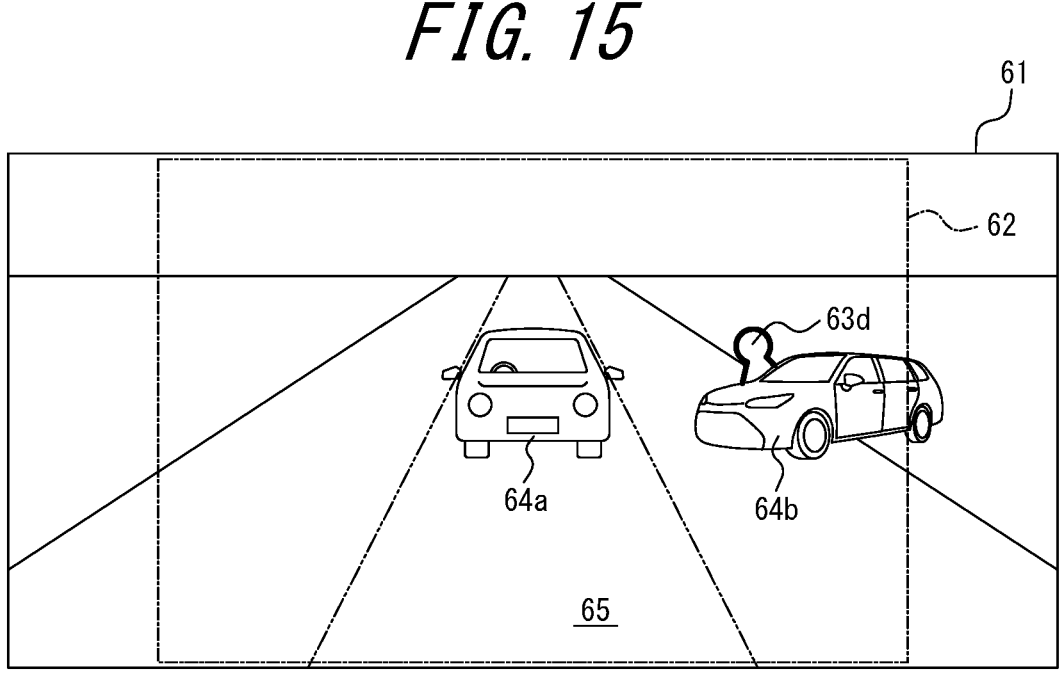
FIG. 15 is a diagram illustrating a fifth example of the first video image.

FIG. 15 illustrates a third example of the detection region 61 of the first video image acquired by the image processing apparatus 30 from the imaging apparatus 20. In the example illustrated in FIG. 15, the detection region 61 is longer in the left-right direction than the up-down direction. The display region 62 is positioned at the center of the left-right direction of the detection region 61. The controller 33 may detect each of a vehicle 64a indicated in the first predicted path 65 of the moving body 50 and a vehicle 64b and a pedestrian 63d indicated outside of the first predicted path 65.

In the third example, a case in which the outside area of the moving body 50 is dark, such as at night or inside a tunnel will be described. When the outside area of the moving body 50 is dark, characteristic values of the first video image and the second video image may decrease. The characteristic values may include any parameters associated with the visibility of the video image. For example, the characteristic values may include at least one of a luminance value and a contrast ratio of the video image. The decrease of the characteristic value of the second video images may lead to a deterioration in the visibility of the second video image.

The controller 33 may perform predetermined image processing on a region corresponding to the detection object in the second video images. The predetermined image processing may include first processing to superimpose a marker corresponding to a detection object on the region. Hereinafter, this marker will also be referred to as a sixth marker. The sixth marker may include, for example, an image substantially corresponding to an outline of the detection object in the second video images. In this configuration, the sixth marker is superimposed on the detection object in the second video images. This enables the subject 60 to easily recognize the detection object in the second video images even when the characteristic value of the second video images is low. The specific image processing may include second processing to change the characteristic value of the region corresponding to the detection object in the second video images. For example, the controller 33 may change the characteristic value of the region in such a manner so as to improve the visibility of the region in the second video images. This configuration improves the visibility of the detection object in the second video images. Thus, the subject 60 can easily recognize the detection object in the second video images even when the characteristic value of the second video images is low.

The controller 33 may perform the specific image processing described above when one or more conditions are met. The one or more conditions may include a condition specifying that the detection object is located in the first predicted path 65 of the moving body 50. The one or more conditions may include a condition specifying that the first predicted path 65 of the moving body 50 and the second predicted path of the detection object overlap with each other. The one or more conditions may include a condition specifying that the distance between the moving body 50 and the detection object is less than a predetermined threshold. The one or more conditions may include a condition specifying that the characteristic value of at least a portion of the second video images is less than a predetermined threshold.

Figure 16:
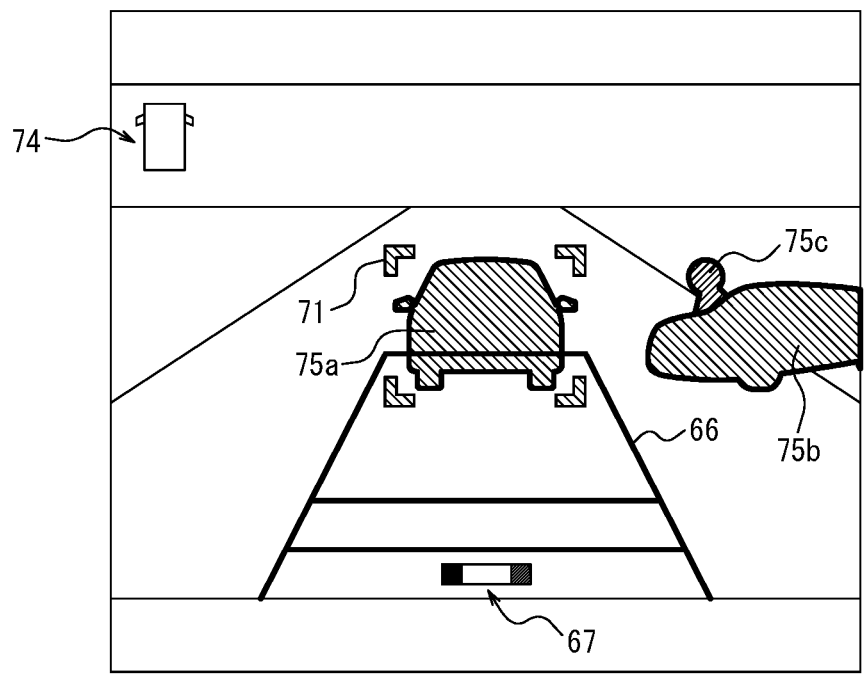
FIG. 16 is diagram illustrating a fifth example of a second video image corresponding to a display region of the first video image of FIG. 15.

In the third example, the controller 33 may determine that the one or more conditions described above are met with respect to the vehicles 64a and 64b and the pedestrian 63d. In this case, the controller 33 may cause sixth markers 75a, 75b, and 75c respectively to the vehicles 64a and 64b and the pedestrian 63d, respectively, to be superimposed on the second video image and displayed on the display apparatus 40 as illustrated in FIG. 16 by way of example. The controller 33 may display the sixth markers on the detection objects in an overlapping manner in a bright place.

Figure 17:
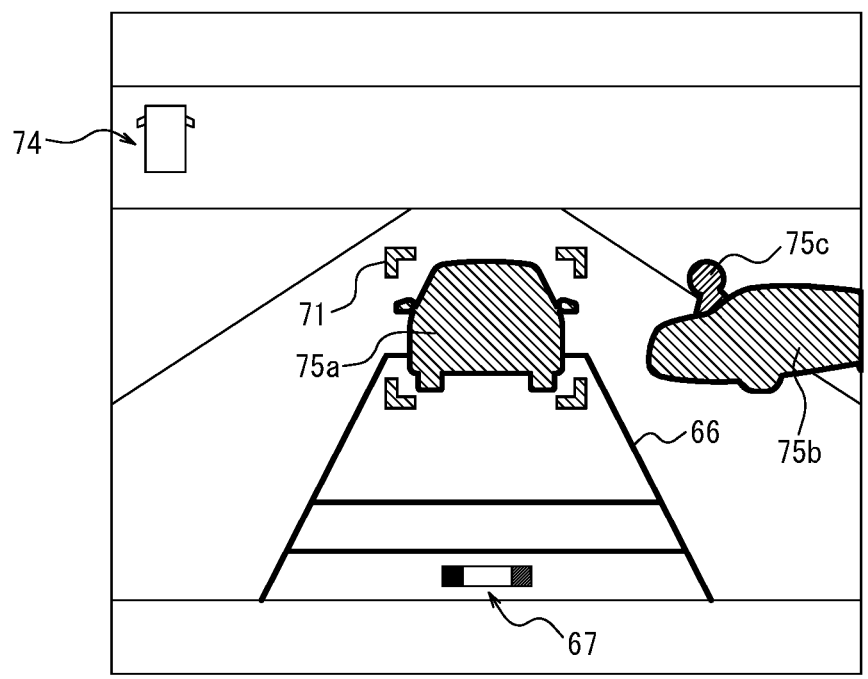
FIG. 17 is a diagram illustrating another example of the second video image corresponding to the display region of the first video image of FIG. 15.

The controller 33 may change a shape of the guide lines 66. The controller 33 may change the shape of the guide lines 66 in a region where the guide lines 66 and the detection object overlap with each other. FIG. 17 illustrates an example of the shape of the guide lines 66. The guide lines 66 are not displayed in a region in which the guide lines 66 overlap the sixth marker 75a in FIG. 17. The shape of the guide lines 66 is not limited to such omission and may accommodate other design changes. Design change includes changes of color, changes of transmittance, changes of line type such as a change to a broken line, or changes of line thickness, and flashing. The controller 33 may change the shape of the guide lines 66 when the sixth marker is not displayed. The controller 33 may change the shape of the guide lines 66 when the first marker 71 and the second marker 72 are displayed as the detection objects.

According to the display system 10 of the first embodiment as described above, a variety of markers corresponding to the detection objects detected in the first video image are superimposed on the second video image and displayed on the display apparatus 40. This configuration enables the subject 60 to recognize a relative positional relationship between the moving body 50 and the detection objects at a glance. Thus, the convenience of technologies for displaying video images of the outside area of the moving body 50 is improved.

Although the present disclosure has been described based on various figures and embodiments, it should be appreciated that those who are skilled in the art may easily perform various changes or modifications based on the present disclosure. Accordingly, such changes and modifications are included in the scope of the present disclosure. For example, a function included in each means or each step may be rearranged, avoiding a logical inconsistency, such that a plurality of means or steps are combined, or a means or a step is subdivided.

For example, each constituent element and function of the display system 10 in the above embodiment may be rearranged. For example, some or all of the configurations and functions of the image processing apparatus 30 may be included in at least one of the imaging apparatus 20 and the display apparatus 40.

Some of the constituent elements of the display system 10 in the above embodiment may be positioned outside of the moving body 5. For example, the image processing apparatus 30 and the like may be configured as a communication apparatus such as a mobile phone or an external server and connected to other constituent elements of the display system 10 in a wired or wireless manner.

The invention claimed is:

1. An image processing apparatus comprising:
    a communication interface configured to acquire a first video image capturing an outside area of a moving body; and
    a controller configured to:
        cause a second video image corresponding to a display region of the first video image to be displayed on a display apparatus;
        detect at least a portion of a detection object in the display region of the first video image;
        determine whether one or more conditions are met based on a relative positional relationship between the moving body and the detection object; and
        when it is determined that the one or more conditions are met, cause a first marker corresponding to the detection object to be superimposed on the second video image and displayed on the display apparatus.

2. The image processing apparatus according to claim 1, wherein the controller is configured to:
    acquire moving body information from the moving body via the communication interface;
    determine a first predicted path of the moving body based on the moving body information; and
    when at least a portion of the detection object is detected, determine a second predicted path of the detection object based on the detection object in the first video image, and further wherein the one or more conditions include a first condition that the detection object is located in the first predicted path of the moving body or a second condition that the first predicted path of the moving body and the second predicted path of the detection object at least partially overlap with each other.

3. The image processing apparatus according to claim 1, wherein the one or more conditions include a third condition that a distance between the moving body and the detection object is less than a threshold.

4. The image processing apparatus according to claim 1, wherein the controller is further configured to:
   detect a plurality of types of objects as detection objects; and
   determine a display mode of the first marker in accordance with a type of an object detected in the first video image.

5. The image processing apparatus according to claim 1, wherein the controller is configured to:
   when a distance between the moving body and the detection object decreases, determine which one of the moving body and the detection object contributes more to the decrease in the distance;
   when it is determined that the moving body contributes more, cause a second marker to be superimposed on the second video image and displayed on the display apparatus in such a manner that the second marker moves from a position different from a superimposed position of the first marker on the second video image toward the superimposed position of the first marker; and
   when it is determined that the detection object contributes more, cause the second marker to be superimposed on the second video image and displayed on the display apparatus in such a manner that the second marker moves from the superimposed position of the first marker on the second video image toward a position different from the superimposed position of the first marker.

6. The image processing apparatus according to claim 5, wherein the controller is configured to determine a moving speed of the second marker based on a rate of decrease of the distance between the moving body and the detection object.

7. The image processing apparatus according to claim 1, wherein the controller is configured to cause the first marker to be superimposed on the second video image and displayed on the display apparatus after causing a third marker corresponding to the detection object to be superimposed on the detection object in the second video image and displayed on the display apparatus, when it is determined that the one or more conditions are met.

8. The image processing apparatus according to claim 1, wherein the controller is configured to display a fourth marker corresponding to the detection object to be superimposed on the second video image and displayed on the display apparatus when a distance between the moving body and the detection object is less than a predetermined threshold.

9. The image processing apparatus according to claim 1, wherein the controller is configured to change a display mode of the first marker when a distance between the moving body and the detection object is less than a predetermined threshold.

10. An image processing apparatus comprising:
    a communication interface configured to acquire a first video image capturing an outside area of a moving body; and
    a controller configured to:
      cause a second video image corresponding to a display region of the first video image to be displayed on a display apparatus;
      detect at least a portion of a detection object in the display region of the first video image; and
      perform specific image processing on a region of the second video image corresponding to the at least a portion of the detection object, the specific image processing including changing a characteristic value of the region of the second video image.

11. The image processing apparatus according to claim 10,
    wherein the specific image processing further includes superimposing a marker corresponding to the detection object on the region of the second video image.

12. The image processing apparatus according to claim 11,
    wherein
    the controller is further configured to:
      detect a plurality of types of objects as detection objects; and
      determine a display mode of the marker in accordance with a type of an object detected in the first video image.

13. The image processing apparatus according to claim 11,
    wherein
    the marker includes an image corresponding to an outline of the at least a portion of the detection object in the second video image.

14. The image processing apparatus according to claim 10,
    wherein
    the characteristic value includes at least one of a luminance value and a contrast ratio of a video image.

15. The image processing apparatus according to claim 10,
    wherein the controller is configured to perform the specific image processing when a first condition specifying that the detection object is located in a first predicted path of the moving body or a second condition specifying that the first predicated path of the moving body and a second predicted path of the detection object at least partially overlap with each other is met.

16. The image processing apparatus according to claim 10,
    wherein the controller is configured to perform the specific image processing when a third condition specifying that a distance between the moving body and the detection object is less than a threshold is met.

17. The image processing apparatus according to claim 10,
    wherein the controller is configured to perform the specific image processing when a fourth condition specifying that a characteristic value of the second image is smaller than a threshold is met.

18. An image processing apparatus comprising:
    a communication interface configured to acquire a first video image capturing an outside area of a moving body; and a controller configured to:
  cause a second video image corresponding to a display region of the first video image to be displayed on a display apparatus;
  detect at least a portion of a detection object in a detection region of the first video image; and
  cause a marker corresponding to the detection object to be superimposed on the second video image and displayed on the display apparatus when a detection position of the at least a portion of the detection object in the first video image is simultaneously located outside of the display region and inside of the detection region.

19. The image processing apparatus according to claim 18,
  wherein the detection object includes a plurality of types of objects, and
  the controller is configured to determine at least one of a color and a shape of the marker in accordance with the type of the object detected in the first video image.

20. The image processing apparatus according to claim 18,
  wherein the controller is configured to:
    when a distance between the moving body and the detection object decreases, determine which one of the moving body and the detection object contributes more to the decrease in the distance;
    when it is determined that the moving body contributes more, cause the marker to be superimposed on the second video image and displayed on the display apparatus in such a manner that at least a portion of the marker moves in a first direction in the second video image; and
    when it is determined that the detection object contributes more, cause the marker to be superimposed on the second video image and displayed on the display apparatus in such a manner that the at least a portion of the marker moves in a second direction in the second video image.

21. The image processing apparatus according to claim 20,
  wherein the controller is configured to determine a moving speed of the at least a portion of the marker in accordance with a rate of decrease of the distance between the moving body and the detection object.

22. The image processing apparatus according to claim 18,
  wherein the controller is configured to change a width of the at least a portion of the marker in accordance with the distance between the moving body and the detection object.

23. The image processing apparatus according to claim 18,
  wherein the controller is configured to:
    cause the marker to be superimposed on a right-side edge region of the second video image when a detection position of the detection object in the first video image is positioned on the right side of the display region; and
    cause the marker to be superimposed on a left-side edge region of the second video image when the detection position of the detection object in the first image is positioned on the left side of the display region.

24. An image processing apparatus comprising:
  a communication interface configured to acquire a first video image capturing an outside area of a moving body; and
  a controller configured to:
    cause a second video image corresponding to a display region of the first video image to be displayed on a display apparatus;
    detect at least a portion of a detection object in a detection region of the first video image; and
    change the display region to encompass the detection position when a detection position of the at least a portion of the detection object in the first video image is located simultaneously outside of the display region and inside of the detection region.

25. The image processing apparatus according to claim 24,
  wherein the controller is configured to change the display region based on a first user operation for changing a steering angle of the moving body.

26. The image processing apparatus according to claim 24,
  wherein the controller is configured to change the display region based on a second user operation performed in respect of the display apparatus.

27. The image processing apparatus according to claim 26,
  wherein the controller is configured to cause an interface image for receiving a second user operation to be superimposed on the second video image and displayed on the display apparatus when the detection position is outside of the display region and, simultaneously, inside of the detection region.

28. The image processing apparatus according to claim 24,
  wherein the controller is configured to:
    cause an interface image to be superimposed on a right-side edge region of the second video image and displayed on the display apparatus when the detection position is located on the right side of the display region; and
    cause the interface image to be superimposed on a left-side edge region of the second video image and displayed on the display apparatus when the detection position is located on the left side of the display region.

* * * * *